UNITED STATES PATENT OFFICE.

EDWARD W. HASLUP, OF BRONXVILLE, NEW YORK, ASSIGNOR TO ROBERT GILCHRIST, OF NEW YORK, N. Y.

PROCESS OF MAKING AMMONIA FROM ATMOSPHERIC NITROGEN.

1,310,479.     Specification of Letters Patent.     Patented July 22, 1919.

No Drawing.     Application filed June 20, 1918. Serial No. 241,019.

*To all whom it may concern:*

Be it known that I, EDWARD W. HASLUP, a citizen of the United States, residing at Bronxville, in the county of Westchester and State of New York, have invented certain new and useful Improvements in Processes of Making Ammonia from Atmospheric Nitrogen; and I do hereby declare the following to be a full, clear, and exact description of the invention, such as will enable others skilled in the art to which it appertains to make and use the same.

This invention relates to a process for effecting the fixation of atmospheric nitrogen, and the production of ammonia, as a by-product in manufacturing producer gas, and has for its object to provide a method which will be more expeditious and less costly than those heretofore proposed.

With these and other objects in view the invention consists in the novel steps and combinations of steps constituting the process, all as will be more fully hereinafter disclosed and particularly pointed out in the claims.

In order that the precise nature of the invention may be more clearly understood it is said:—

It is well known that when free or combined alkali metal oxids, or alkali earth metal oxids capable of forming salts with acids, are exposed to carbon and heated to a sufficiently high temperature in an atmosphere of nitrogen free of oxidizing gases, such as oxygen, carbon dioxid, etc., that a nitrogen and carbon containing compound is formed, which at its heat of formation is volatile, or at least has the physical properties of a sublimate.

Processes utilizing this principle have been made the subjects of Patents #1,134,411; #1,134,412; and #1,134,413; each dated April 6, 1915, and issued to Samuel Peacock.

But, in following the procedure of said patents, it is not only essential to remove the sublimed nitrogenous compound or carbo-nitrid from a furnace chamber necessarily sealed from the air, to prevent destroying the compound, but the carbo-nitrid values must be collected and cooled out of contact with the air, by some means, and to such a temperature as will preclude their decomposition upon contact with oxygen, and all in a continuous industrial operation. The mechanical problem thus presented in carrying out an industrial procedure is evidently a very difficult one. In practice all processes of this kind for such nitrogen fixation, in the form of cyanamid compounds, have been limited in their operation to the use of electrically generated heat, in one form or another, for electricity seemed to furnish the only means of readily obtaining the desired temperature in a sealed furnace or oven. But, electrically generated heat is comparatively costly. In fact, the heat equivalent of a kilowatt year which may cost from say $25 to $100 is found in less than three thousand pounds of ordinary steam coal. It is true that there are a few localitites where hydro-electric power may be obtained at a cost of approximately $15 per kilowatt year; but it is also true that there are a greater number of locations where three thousands pounds of coal would cost from say three to four dollars only. Hence, it is obvious that a procedure which would enable the use of directly generated heat from coal in such nitrogen fixation processes would be an economic gain. Now, it is well known, in the operation of a carbon monoxid gas producer, or in the operation of a blast furnace, that if one examines the furnace chamber a few feet above the air blast inlet, or twyers, he will find the furnace gases to contain neither free oxygen, carbon dioxid, nor other readily oxidizing gases, and that the gaseous nitrogen present ranges from say 50 to 60 per cent. of the total volume. The temperature of the furnace gases at this particular point, also will be found to be very high, certainly above 1000° C., while the temperature of the coke and inorganic bodies in this zone of high temperature often exceeds say 1400° C. In an ordinary blast furnace, at such temperatures, most oxids in contact with carbon and in the presence of gaseous nitrogen, form a nitrogen containing compound, or carbo-nitrid, which has approximately the proportional formula $RCN_2$, and which when heated with water produces ammonia.

But, unless prevented, these compounds will sublime as formed, and will rise with the combustion gases to the usual furnace exit, where they will be destroyed by contact with the air, producing a white cloud of "fume" consisting of oxids and carbonates of the combined metals present in a state of very fine sub-division. Further, unless special precautions are taken to exclude the presence of carbon dioxid the latter will at once decompose any carbonitrids formed in accordance with the following equation:—

$$K_2CN_2 + 3CO_2 = K_2CO_3 + 3CO + N_2$$

If an iron blast furnace is used, the action of the carbon monoxid of the furnace gases upon the iron oxid present results in the formation of metallic iron and carbon dioxid, and this latter gas at once reacts with and destroys the nitrogen containing sublimate, or carbo-nitrid, substantially in accordance with the following equation:—

$$RCN_2 + 2CO_2 = RO + 3CO + N_2$$

When oxids are not easily formed then the carbonitrid is decomposed in accordance with the following equation:—

$$RCN_2 + 3CO_2 = RCO_3 + 3CO + N_2$$

If no iron oxid is present, there is still a loss of combined nitrogen, because the sublimate or carbonitrid, is more or less condensed by the cold charge at the furnace top, and is carried down with the descending charge until it reaches a temperature high enough to combine with the silicious slag making material of the furnace charge, but not high enough to cause the nitrogen compound to sublime. As a result, a silicate of the carbo-nitrid metal is formed with the evolution of free nitrogen. It does not seem to have occurred to any one prior to my invention, that if the furnace gases be removed from the zone of maximum temperature containing an excess of carbon, and through an exit located so low in the furnace that no substantial condensation of said carbo-nitrids will occur, that said carbo-nitrids could be tapped out and recovered.

The reason why no one seems to have suggested such a procedure, probably resides in the fact that the tapping of the furnace gases in any such fashion from an iron blast furnace would render the latter inoperative commercially; and the tapping of the furnace gases in such manner from a producer gas furnace would be a useless procedure, for no carbo-nitrids would be present.

On the other hand, were not these two objections present, it would be perfectly feasible to employ either a blast furnace, or a producer gas furnace in the manner stated, and to obtain carbo-nitrids of the character disclosed in the patents above referred to.

In carrying out this invention, I avoid the foregoing objections and obtain carbo-nitrids from either a blast or a producer type of furnace by proceeding as follows:—

I charge the furnace with feldspar and coke, or lime and coke, or magnesia and coke, or other oxid (capable of forming a salt with an acid) and coke, precisely as an iron blast furnace, or gas producer is charged, except an excess of carbon amounting to say 30% is employed, and I make producer gas, using a hot blast. In some cases, suitable fluxes may also be added to the charge, for the purpose of conveniently removing such materials as silica from the furnace, as a molten slag. I prefer, however, to finely grind the coke and the oxid containing salt or mineral, and briquet the same for furnace treatment. The following four chemical equations, stated in proportional formula, illustrate the substantial reactions that take place:—

$$Feldspar\ (2AlKSi_3O_8) + 2C + N_2 \rightarrow$$
$$K_2CN_2 + CO + Al_2Si_6O_{15};$$
$$Na_2CO_3 + 3C + N_2 = Na_2CN_2 + 3CO;$$
$$CaO + 2C + N_2 = CaCN_2 + CO;$$
$$MgO + 2C + N_2 = MgCN_2 + CO;$$

In all four of these illustrations, the reaction involves a high temperature zone of not less than say 1400° C. If this temperature is raised to 1600° C. the alumina of the feldspar is also converted to the nitrogen compound.

In carrying out the process, the use of a hot blast is very desirable in most cases, in order to keep the charge sufficiently hot to secure a readily flowing slag, and it is also very important that sufficient carbon shall always be present in the fusion zone to convert any $CO_2$ gas that may be formed into carbon monoxid. As no iron oxids are to be reduced no objections are encountered in tapping off the furnace gases at a suitable point, such as the hottest portion of the fusion zone, near the twyers, or where the carbo-nitrids are found to be richest, and this I do. Ordinarily such a point in a blast furnace is found to be at the usual reducing zone, just above the boshes.

After the furnace gases containing the carbo-nitrid have been thus led from the reducing zone, they are carried out of contact with the air to any suitable scrubber, provided with a water supply, where, the said carbo-nitrid being at a high temperature will react with the water to form ammonia and a carbonate in accordance with the following equation:—

$$RCN_2 + 3H_2O = RCO_3 + 2NH_3.$$

The ammonia thus formed is now passed with the carbon monoxid and other furnace gases to a suitable saturator, which may contain a solution of sulfuric or nitric acid, whereupon the said ammonia is converted into a solution of ammonium sulfate, or ammonium nitrate as the case may be, and the CO and other gases pass on to a suitable separator where the carbon monoxid is separated out and recovered by any suitable and well-known means.

The solution of ammonium sulfate or nitrate produced as above may be suitably concentrated and the salts recovered in a manner well known.

It will now be clear that by making producer gas in a regular producer gas furnace, or in an iron blast furnace, and by having present in such furnaces an excess of carbon, and a material containing an oxid of an alkali metal, or of an alkali-earth metal, or a naturally occurring mineral such as feldspar, during the process of making said producer gas, I am enabled to not only fix atmospheric nitrogen as a by-product, without the use of electric heat, but I am enabled to continuously tap it directly from the reducing zones of said furnaces and thus avoid its condensation on the cooler portions of said furnaces, and on their charge materials.

I am further enabled to take advantage of the heat already in said gases and lead them directly into the presence of water to convert their carbo-nitrid content into ammonia and thus avoid the expense attending the use of an autoclave, for this purpose.

The employment of an excess of carbon in the fusion zone serves to supply heat for the endothermic reaction, it insures the absence of carbon dioxid in the furnace, and also a maximum reduction of the basic material in the fusion zone. Each of these conditions serves to increase the yield of carbonitrid.

This process should be carefully distinguished from prior proposals to produce metal cyanids, not metal cyanamids, in blast furnaces. Such cyanid processes prefer the presence of iron oxid in order that the $CO_2$ present may reduce the same and be converted into carbon monoxid CO, while my process could not operate in the presence of any substantial portion of carbon dioxid, $CO_2$, for the latter would destroy the carbonitrid as fast as it is formed. Further, metal cyanids may be regarded as products resulting from the breaking up of other compounds. Their atomic linkage is different and their formative reactions are different from metal cyanamids. It results that ammonia can not be formed from such cyanids by treatment with steam with the same efficiency as is the case with metal and alkali-earth metal cyanamids.

This application differs among other things from my copending application #227,316, filed April 8, 1918, entitled process of recovering fixed nitrogen, in that this application converts the hot volatile carbo-nitrid into ammonia.

The reaction velocities are of course increased both by a hot blast and by preheating the charge, but neither is essential in all cases to the successful operation of the process. The gas which finally exits from the settlers or scrubbers is found to be a high grade producer gas suitable for use in internal combustion engines.

What I claim is:—

1. The process of producing ammonia which consists in preparing a mixture containing carbon, and an oxid capable of forming a salt with an acid; subjecting said mixture in a fuel fed furnace and in an atmosphere of producer gas to a temperature sufficient to produce a carbo-nitrid; tapping out said carbo-nitrid and said producer gas from a region of said furnace too hot to permit said carbo-nitrid to condense; treating the hot gases with water to form ammonia from the carbo-nitrid present; and separating out said ammonia from the other gases present, substantially as described.

2. The process of producing ammonia which consists in preparing a mixture of carbon, and an oxid of an element having an alkaline reaction; subjecting said mixture to the action of a fuel fed furnace at a temperature and under conditions suitable for forming a mixture of producer gas and a volatile carbo-nitrid; tapping off said mixture out of contact with the air from a point in said furnace at which the temperature is sufficient to prevent the condensation of said carbo-nitrid; treating the hot gases with water to form ammonia from the carbo-nitrid present; passing said ammonia and gases into a separator to recover said ammonia; and passing the remaining gases into a second separator and recovering the carbon monoxid present, substantially as described.

3. The process of fixing atmospheric nitrogen and recovering ammonia which consists in preparing a mixture of carbon and a material containing an oxid capable of forming a salt with an acid; heating said mixture in a fuel fed furnace under conditions suitable for forming a mixture of carbon monoxid gas and a volatile carbo-nitrid; leading off said second mixture out of contact with the air before said carbo-nitrid has condensed; treating the hot gases thus recovered with water to produce ammonia from the carbo-nitrid present; and passing said ammonia through an acid solution to form a salt of ammonia, and recovering the latter, substantially as described.

4. The process of fixing atmospheric nitrogen in a fuel fed furnace and producing ammonia which consists in charging said furnace with a mixture containing calcium oxid and carbon in excess; heating said mixture under conditions suitable for forming producer gas and a volatile carbo-nitrid; tapping said furnace at a point the temperature of which is too high to permit the condensation of said carbo-nitrid; and treating the latter while still hot with water, substantially as described.

5. The process of making volatile carbonitrids and recovering ammonia therefrom which consists in producing said carbo-nitrids in an atmosphere of carbon monoxid gas in a fuel fed furnace; withdrawing said carbo-nitrids before condensation along with a portion of said carbon monoxid gas; treating the mixture with water to produce ammonia; and separating said ammonia from said producer gas, substantially as described.

6. The process of making ammonia which consists in charging a blast furnace with a mixture containing lime and carbon; heating said mixture under conditions suitable for excluding the presence of carbon dioxid and causing the presence of carbon monoxid and volatile calcium cyanamid in said furnace; tapping the fusion zone of said furnace and withdrawing therefrom the hot carbon monoxid and calcium cyanamid present; treating said hot compounds with water to form ammonia; and separating the ammonia thus produced from the said carbon monoxid, substantially as described.

7. The process of making ammonia which consists in charging a blast furnace with a mixture containing lime and carbon in excess; heating said mixture about 1000° C. under conditions suitable for excluding the presence of carbon dioxid and causing the presence of carbon monoxid and volatile calcium cyanamid in said furnace; tapping the fusion zone of said furnace and withdrawing therefrom the hot carbon monoxid and calcium cyanamid present; treating said hot compounds with water to form ammonia; and separating the ammonia thus produced from the said carbon monoxid, by passing said gases through an acid containing liquid, substantially as described.

In testimony whereof I affix my signature in presence of two witnesses.

EDWARD W. HASLUP.

Witnesses:
M. C. WALSH,
M. M. MURPHY DREW.